(12) United States Patent
Okamoto et al.

(10) Patent No.: US 9,172,576 B2
(45) Date of Patent: Oct. 27, 2015

(54) BASE STATION AND METHOD OF ADJUSTING REFERENCE TIMING ON BASE STATION

(75) Inventors: Tetsuo Okamoto, Yokohama (JP); Masashi Iwami, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 654 days.

(21) Appl. No.: 13/575,350

(22) PCT Filed: Jan. 26, 2011

(86) PCT No.: PCT/JP2011/051408
§ 371 (c)(1),
(2), (4) Date: Jul. 26, 2012

(87) PCT Pub. No.: WO2011/093301
PCT Pub. Date: Aug. 4, 2011

(65) Prior Publication Data
US 2012/0294138 A1 Nov. 22, 2012

(30) Foreign Application Priority Data
Jan. 26, 2010 (JP) ................. 2010-014685

(51) Int. Cl.
*H04B 7/212* (2006.01)
*H04L 27/26* (2006.01)
*H04W 56/00* (2009.01)
*H04J 11/00* (2006.01)

(52) U.S. Cl.
CPC ......... *H04L 27/2688* (2013.01); *H04J 11/0059* (2013.01); *H04L 27/2665* (2013.01); *H04L 27/2672* (2013.01); *H04L 27/2691* (2013.01); *H04W 56/0055* (2013.01)

(58) Field of Classification Search
CPC .. H04B 7/2125; H04B 7/2126; H04B 7/2665; H04B 7/2668; H04B 7/2687; H04B 7/269; H04B 7/2693; H04W 56/001; H04W 56/0015; H04W 56/002
See application file for complete search history.

(56) References Cited

U.S. PATENT DOCUMENTS 7,362,832 B2 4/2008 Yoshida
2008/0279124 A1 11/2008 Furueda et al.

FOREIGN PATENT DOCUMENTS

JP 2001-251273 A 9/2001
JP 2004-208254 A 7/2004
(Continued)

OTHER PUBLICATIONS

International Preliminary Report on Patentability issued for International Application No. PCT/JP2011/051408.
(Continued)

*Primary Examiner* — Alvin Zhu
(74) *Attorney, Agent, or Firm* — Procopio, Cory, Hargreaves & Savitch, LLP

(57) ABSTRACT

An FFT processing unit performs an FFT process on an OFDM signal received by a reception unit. Based on an output signal of the FFT processing unit, an interference wave level acquisition unit obtains a signal level of an interference wave in a unit radio resource not used by the base station with respect to each of a plurality of candidate timings for the reference timing in the base station. A reference timing adjustment unit determines a new timing of the reference timing from the plurality of candidate timings based on the signal level of the interference wave obtained by the interference wave level acquisition unit.

3 Claims, 11 Drawing Sheets

(56) References Cited

FOREIGN PATENT DOCUMENTS

| | | |
|---|---|---|
| JP | 2004-336279 A | 11/2004 |
| JP | 2007-312114 A | 11/2007 |
| JP | 2008-182688 A | 8/2008 |
| JP | 2008-244860 A | 10/2008 |
| JP | 2009-260772 A | 11/2009 |
| WO | 2009/110756 A1 | 9/2009 |

OTHER PUBLICATIONS

ARIB Standard, OFDMA/TDMA TDD Broadband Wireless Access System (Next Generation PHS), ARIB STD-T95 Version 1.1, Jun. 6, 2008, Association of Radio Industries and Businesses.

F I G . 1
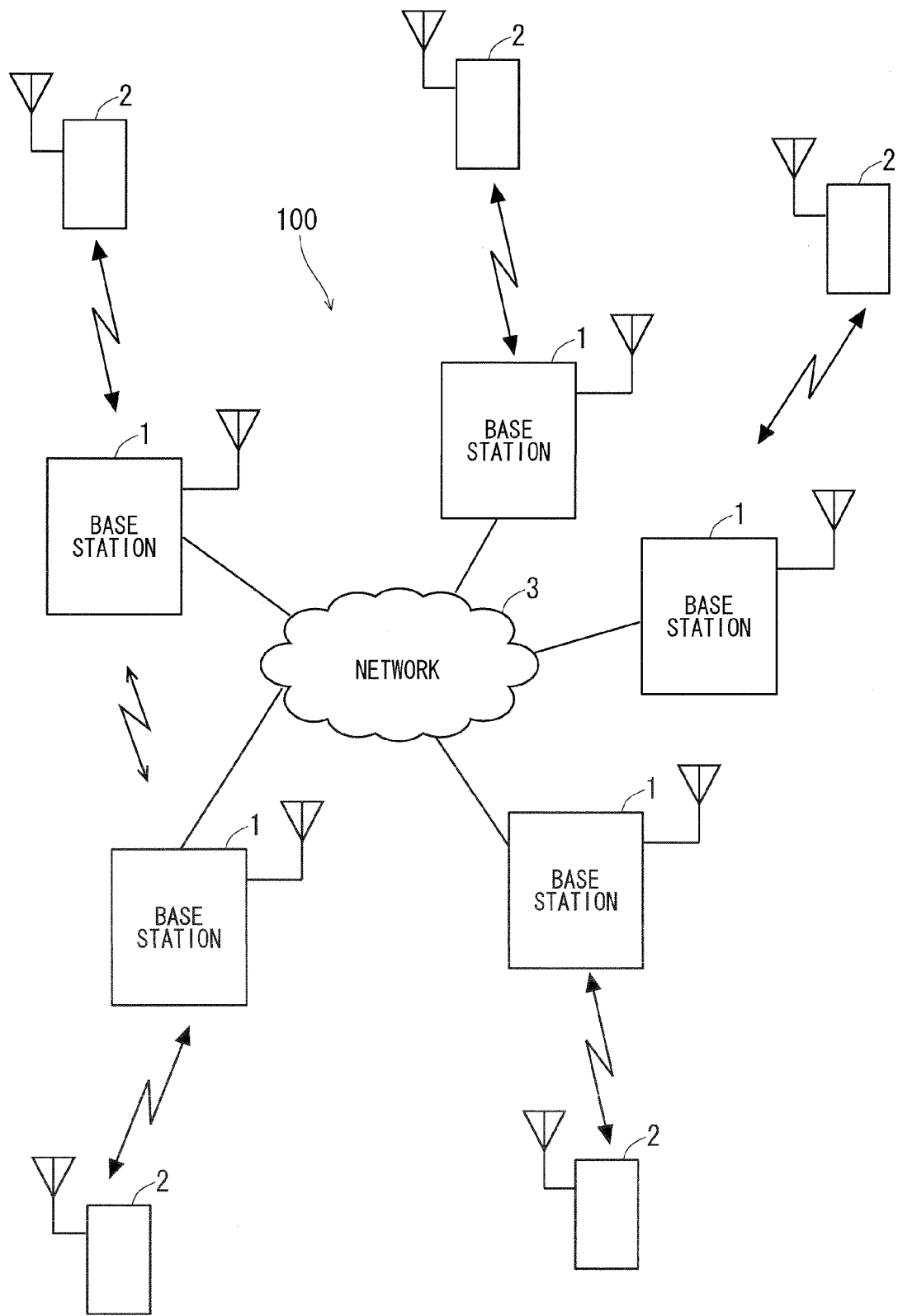

F I G . 4
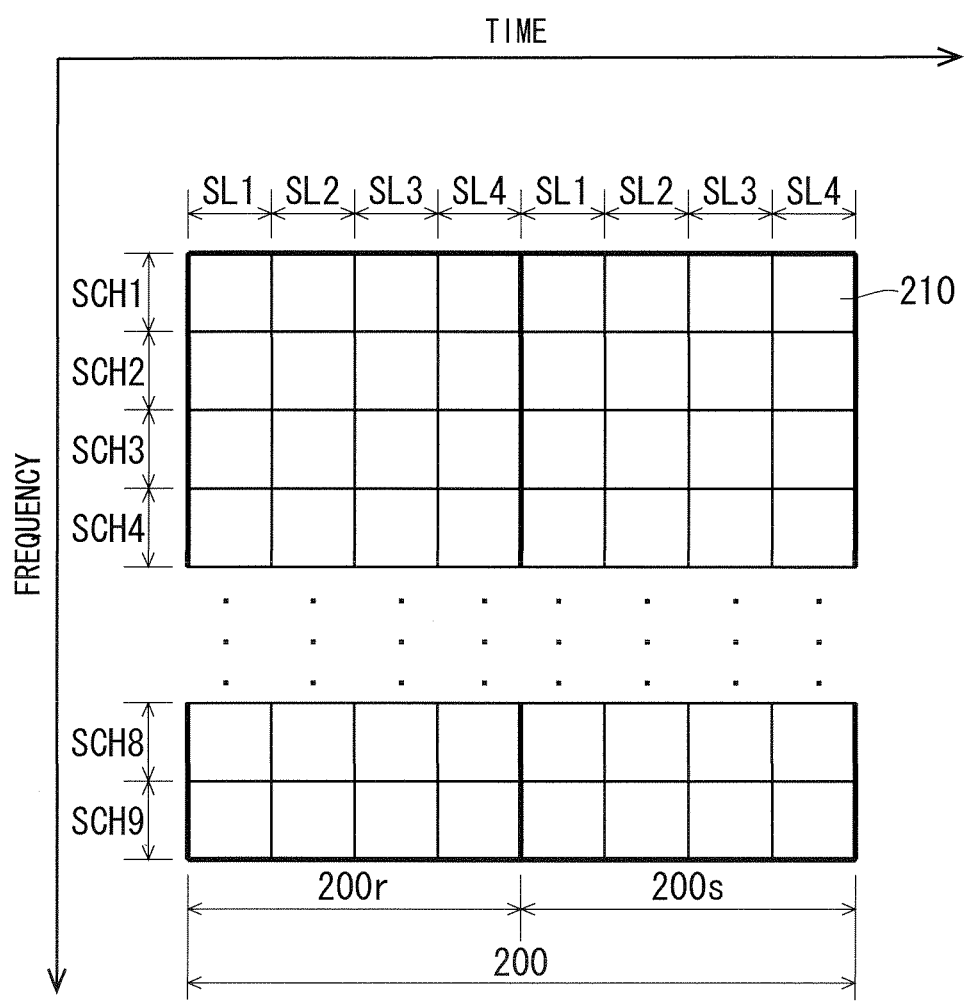

F I G. 1 2
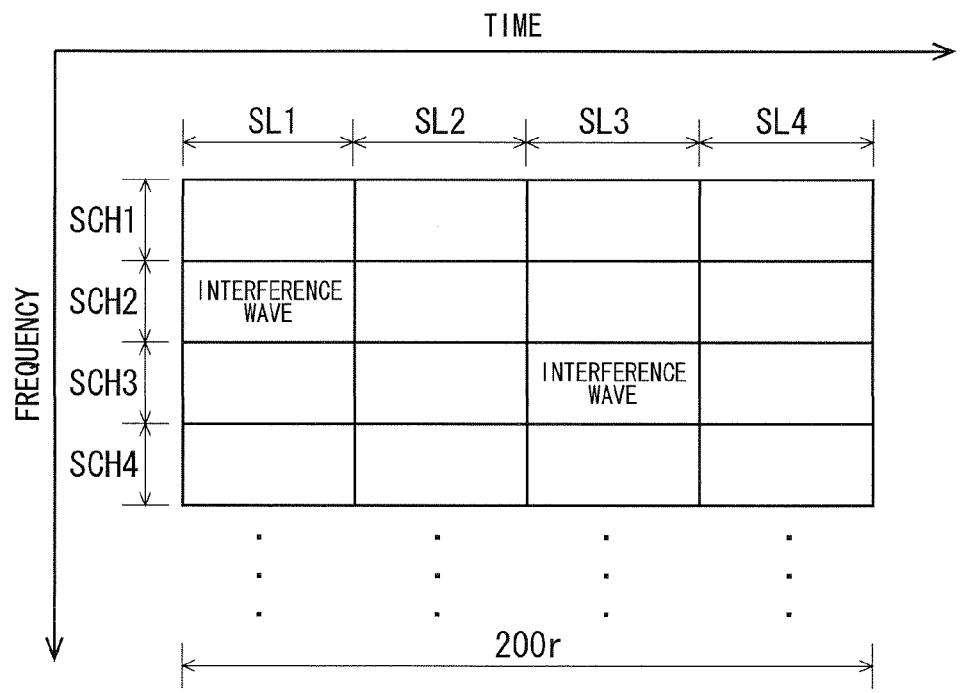
F I G. 1 3
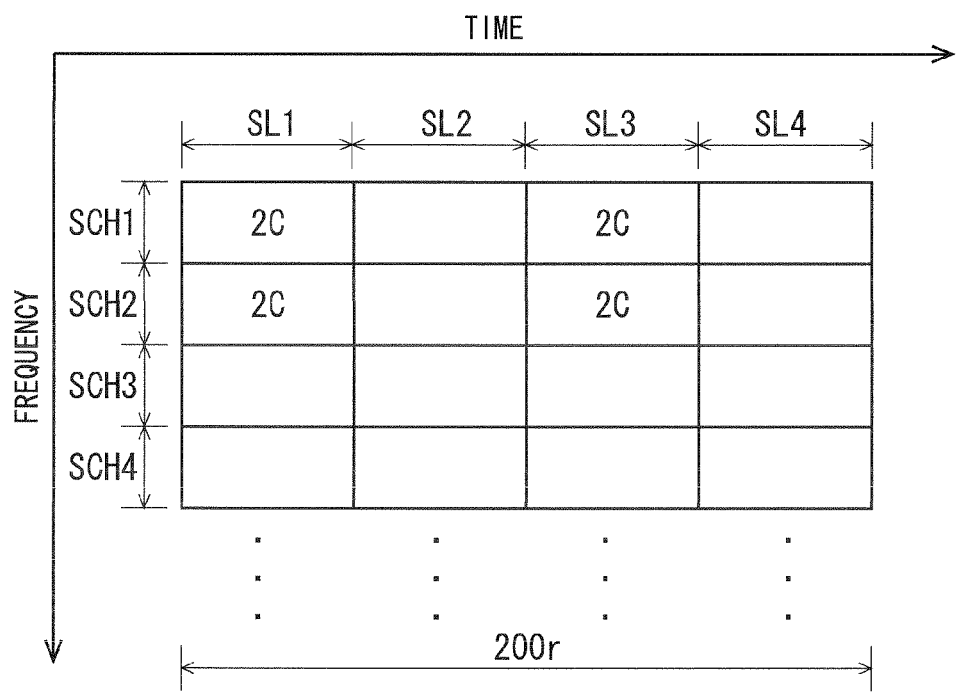

BASE STATION AND METHOD OF ADJUSTING REFERENCE TIMING ON BASE STATION

TECHNICAL FIELD

The present invention relates to a technique for adjusting a reference timing in a base station that communicates with a plurality of communication terminals.

BACKGROUND ART

Conventionally, various techniques have been proposed as wireless communication techniques. For example, Patent Document 1 discloses a technique for reducing inter-symbol interference and inter-carrier interference in a reception apparatus. Non-Patent Document 1 discloses a standard for a next-generation PHS (Personal Handyphone System). This standard is called XGP (eXtended Global Platform).

PRIOR-ART DOCUMENTS

Patent Documents

Patent Document 1: Japanese Patent Application Laid-Open No. 2004-208254

Non-Patent Documents

Non-Patent Document 1: "OFDMA/TDMA TDD Broadband Wireless Access System (Next Generation PHS) ARIB STANDARD", ARIB STD-T95 Version 1.1, Jun. 6, 2008, Association of Radio Industries and Businesses

SUMMARY OF THE INVENTION

Problems to be Solved by the Invention

In the next-generation PHS, a base station performs multiple access communication with a plurality of communication terminals in a frequency domain by the OFDMA (Orthogonal Frequency Division Multiple Access) scheme using an OFDM (Orthogonal Frequency Division Multiplexing) signal in which a plurality of subcarriers being orthogonal to one another are combined. The base station performs the communication with each of the communication terminals based on a reference timing specified in its own device. Accordingly, if the communication terminal transmits a signal at its own timing while no synchronization is established between the base station and the communication terminal, the base station may fail to perform an FFT process on the signal transmitted from the communication terminal in an appropriate FFT (Fast Fourier Transform) window position. As a result, the base station may fail to accurately obtain data included in the signal received from the communication terminal. Moreover, since the base station adopts the OFDMA scheme, when the base station communicates with a plurality of communication terminals, one OFDM signal is made from signals transmitted from the plurality of communication terminals. Therefore, in a case where timings at which the base station receive the signals from the plurality of communication terminals are not coincident, the orthogonality among the signals received from the plurality of communication terminals is lost, which may make it impossible for the base station to accurately obtain data included in these reception signals.

To solve such a problem, in starting communication between the base station and the communication terminal, a ranging process between them is performed. In this ranging process, the base station obtains a delay amount by which a reception timing of receiving the signal from the communication terminal is delayed from a reference timing specified in the own device, based on a known signal transmitted from the communication terminal. Then, the base station controls a transmission timing in the communication terminal based on the obtained delay amount. Thereby, the base station can receive all the signals from the plurality of communication terminals at the reference timing. This consequently enables the base station to perform the FFT process in an appropriate FFT window position with respect to the signal from each communication terminal, and additionally enables the orthogonality among the signals from the plurality of communication terminals to be ensured. Accordingly, the base station can more appropriately obtain the data included in the signal from each communication terminal.

In the next-generation PHS, a plurality of base stations, while being in synchronization with one another, perform communication with communication terminals. Each of the base stations obtains a signal level of an interference wave based on a result of the FFT process performed on the reception signal, and identifies a radio resource not used by a surrounding base station based on the signal level of the interference wave. Each of the base station communicates with the communication terminal by using the radio resource not used by the surrounding base station. Thereby, a signal interference among the plurality of base stations can be suppressed.

As described above, each base station controls the transmission timing in the communication terminal such that the signal from the communication terminal is received at the reference timing of the own device. Accordingly, focusing on a certain base station, in a case where the focused base station receives, as an interference wave, a signal from a communication terminal that is communicating with a surrounding base station synchronized with the focused base station and that is located in a position closer to the focused base station than to the surrounding base station, the focused base station receives the signal from this communication terminal at a timing earlier than the reference timing. If a base station receives a signal from a communication terminal at a timing earlier than its reference timing, an FFT window position with respect to the reception signal is shifted. Therefore, in the focused base station, an interference wave is detected also in a frequency band other than a frequency band used by the surrounding base station. This may cause inter-carrier interference due to a shift of an FFT window position. As a result, the communication quality of the focused base station may deteriorate.

The present invention is made in view of the above-described points, and an object of the present invention is to provide a technique that can improve the communication quality of a base station.

Means for Solving the Problems

A base station according to the present invention is one base station included in a wireless communication system in which a plurality of base stations in synchronization with one another perform communication with communication terminals, wherein each of the plurality of base stations performs communication with a plurality of communication terminals based on a reference timing while sharing a plurality of unit radio resources identified on a time-frequency plane among the plurality of communication terminals, and the one base station includes: a reception unit for receiving a multi-carrier signal in which a plurality of carrier waves being orthogonal to one another are combined; an FFT processing unit for performing an FFT (Fast Fourier Transform) process on the multi-carrier signal received by the reception unit; an interference wave level acquisition unit for obtaining, with respect to each of a plurality of candidate timings for the reference timing, a signal level of an interference wave in a unit radio resource not used by the one base station, based on an output signal of the FFT processing unit; and a reference timing adjustment unit for determining a new timing of the reference timing from the plurality of candidate timings based on the signal level of the interference wave obtained by the interference wave level acquisition unit.

In one aspect of the base station according to the present invention, the reference timing adjustment unit sets, among the plurality of candidate timings, the timing that gives the largest number of such unit radio resources that the signal level of the interference wave is equal to or less than a threshold value, to be the new timing of the reference timing.

In one aspect of the base station according to the present invention, there are further provided: a transmission timing control unit for, when the reference timing adjustment unit changes the reference timing, generating a control signal for adjusting a transmission timing in a communication terminal that is currently in communication with the one base station, in accordance with the amount of change of the reference timing; and a transmission unit for transmitting the control signal to the communication terminal that is currently in communication.

A method for adjusting a reference timing in a base station according to the present invention is a method for adjusting a reference timing in one base station included in a wireless communication system in which a plurality of base stations in synchronization with one another perform communication with communication terminals, wherein each of the plurality of base stations performs communication with a plurality of communication terminals based on a reference timing while sharing a plurality of unit radio resources identified on a time-frequency plane among the plurality of communication terminals, and the method includes the steps of: (a) in the one base station that performs a communication operation at one candidate timing among a plurality of candidate timings for the reference timing, performing an FFT process on a multi-carrier signal received by the one base station in which a plurality of carrier waves being orthogonal to one another are combined; and (b) in the one base station that performs the communication operation at the one candidate timing, obtaining a signal level of an interference wave in a unit radio resource not used by the one base station based on a result of the FFT process performed in the step (a), and the steps (a) and (b) are performed with respect to each of the plurality of candidate timings, and the method further includes the step of: (c) determining a new timing of the reference timing from the plurality of candidate timings based on the signal levels of the interference waves obtained with respect to the plurality of candidate timings in the step (b).

Effects of the Invention

In the present invention, the communication quality of the base station can be improved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 A diagram showing a configuration of a wireless communication system including base stations according to an embodiment.

FIG. 4 A diagram showing a configuration of a TDMA/TDD frame according to the embodiment.

FIG. 12 A diagram showing a situation where the base station receives the interference wave in a plurality of slots.

FIG. 13 A diagram showing an example of allocation of PRUs to a communication terminal.

EMBODIMENT FOR CARRYING OUT THE INVENTION

Figure 2:
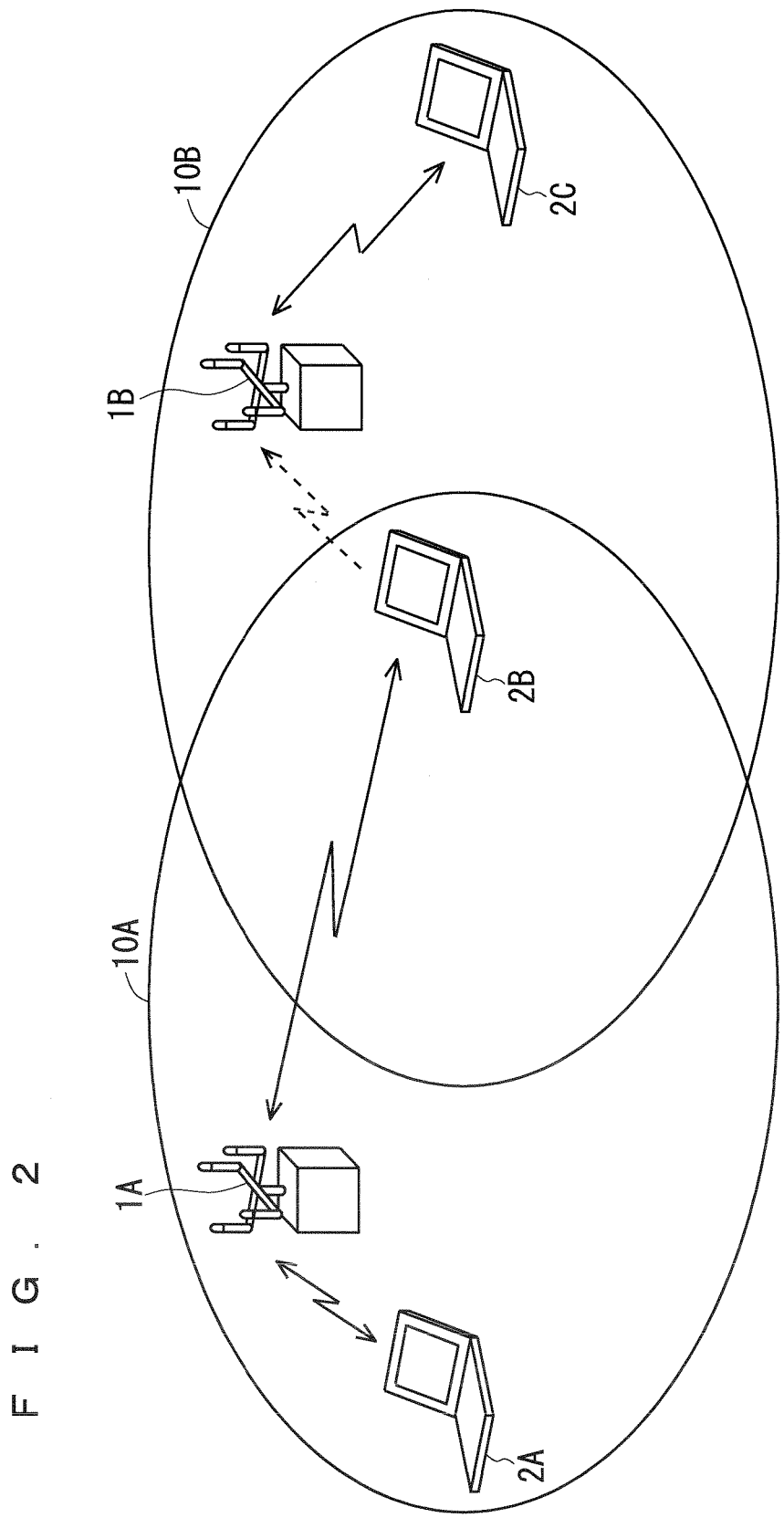
FIG. 2 A diagram showing an example of locations of the base stations according to the embodiment.

FIG. 1 is a diagram showing a configuration of a wireless communication system 100 including base stations 1 according to this embodiment. The wireless communication system 100 is, for example, a next-generation PHS, and includes a plurality of base stations 1 that perform communication with communication terminals 2 while being in synchronization with one another. Each of the base stations 1 performs the communication with the communication terminal 2 based on a reference timing that is specified in its own device. Each of the base stations 1 is connected to a network 3 by an optical fiber or the like. Each of the base stations 1 transmits data received from the communication terminal 2 to the network 3, and transmits data received from the network 3 to the communication terminal 2.

In the wireless communication system 100, each of the base stations 1 performs wireless communication with the plurality of communication terminals 2 by the TDMA/TDD scheme (Time Division Multiple Access/Time Division Duplexing). In this TDMA/TDD scheme, a reception period including four slots and a transmission period including four slots alternately appear. In the wireless communication system 100, the OFDMA scheme is also adopted as a multiple access scheme. In the OFDMA scheme, an OFDM signal is used that is a multi-carrier signal in which a plurality of carrier waves being orthogonal to one another are combined. Each of the base stations 1 performs multiple access communication with a plurality of communication terminals 2 in a time domain and a frequency domain, while a plurality of unit radio resources (this unit radio resource is called "PRU (Physical Resource Unit)") that are identified on a time-frequency plane are shared among the plurality of communication terminals 2.

FIG. 2 shows an example of locations of the base stations 1. FIG. 2 shows two base stations 1A and 1B among the plurality of base stations 1 included in the wireless communication system 100, and a service area of the base station 1A and a service area of the base station 1B are shown as a "service area 10A" and a "service area 10B", respectively. In the example shown in FIG. 2, the base station 1A communicates with two communication terminals 2 (communication terminals 2A and 2B), and the base station 1B communicates with one communication terminal 2 (communication terminal 2C).

As shown in FIG. 2, each of the base stations 1 is located such that the service area thereof partially overlaps the service area of the adjacent base station 1. In the example shown in FIG. 2, the communication terminal 2B currently in communication with the base station 1A exists in the service area 10B of the base station 1B, too, and therefore a signal transmitted from the communication terminal 2B is received as an interference wave by the base station 1B, as indicated by the dashed arrow.

Figure 3:
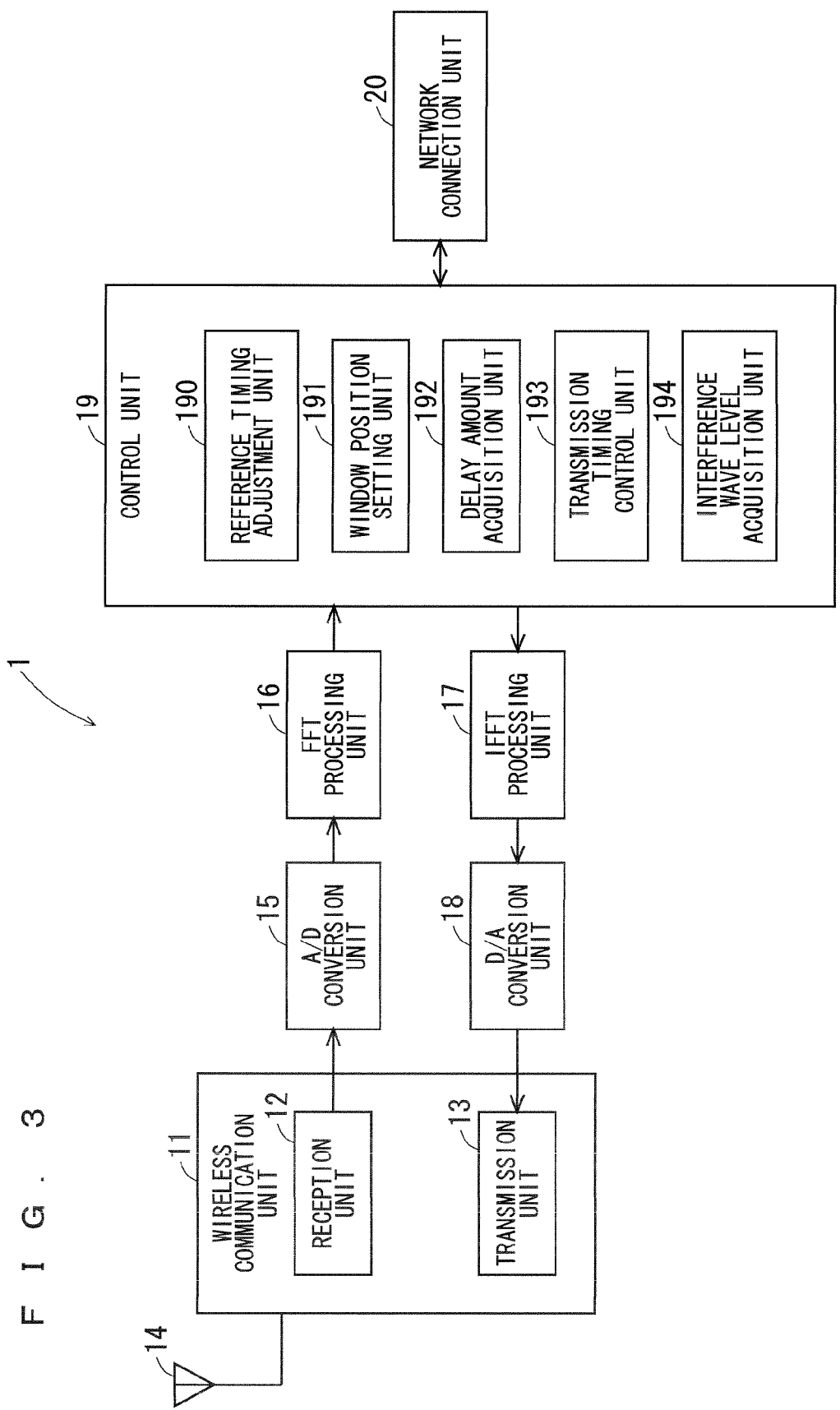
FIG. 3 A block diagram showing a configuration of the base station according to the embodiment.

FIG. 3 is a diagram showing a configuration of each of the base stations 1. As shown in FIG. 3, the base station 1 includes a wireless communication unit 11 with a reception unit 12 and a transmission unit 13, an A/D conversion unit 15, an FFT processing unit 16, an IFFT processing unit 17, a D/A conversion unit 18, a control unit 19, and a network connection unit 20. The reception unit 12 and the transmission unit 13 share a transmission/reception antenna 14.

The reception unit 12 performs an amplification process and a down-conversion on an OFDM signal received through the transmission/reception antenna 14, converts the OFDM signal into a base-band signal, and outputs the base-band signal.

The A/D conversion unit 15 converts the base-band signal in an analog form outputted from the reception unit 12 into a base-band signal in a digital form.

The FFT processing unit 16 performs an FFT process on the base-band signal outputted from the A/D conversion unit 15, to separate a plurality of subcarriers included in the base-band signal and output them. More specifically, the FFT processing unit 16 outputs a complex symbol for modulating each of the plurality of subcarriers included in the base-band signal.

The control unit 19 is composed of, for example, a CPU and a memory, and collectively manages an operation of the whole of the base station 1. The control unit 19 performs a descrambling process, a Viterbi decoding process, and the like, on the complex symbol outputted from the FFT processing unit 16, to recover bit data transmitted from the communication terminal 2. The control unit 19 inputs, from the recovered data, data that should be transmitted to the network 3, to the network connection unit 20.

The control unit 19 generates transmission data to be transmitted to the communication terminal 2 based on, for example, data received from the network connection unit 20, and generates a plurality of complex symbols corresponding to the generated transmission data. Then, the control unit 19 performs a convolutional encoding process, a scrambling process, and the like, on the plurality of generated complex symbols, and inputs resulting complex symbols to the IFFT processing unit 17.

The IFFT processing unit 17 performs an IFFT (Inverse FFT) process on the plurality of inputted complex symbols, and outputs a base-band signal in which a plurality of subcarriers modulated by these plurality of complex symbols are combined.

The D/A conversion unit 18 converts the base-band signal in a digital form outputted from the IFFT processing unit 17 into a base-band signal in an analog form.

The transmission unit 13 performs an up-conversion and an amplification process on the base-band signal outputted from the D/A conversion unit 18, and then inputs a resulting signal to the transmission/reception antenna 14. Thereby, through the transmission/reception antenna 14, an OFDM signal of a carrier wave band is wirelessly transmitted to the communication terminal 2.

The network connection unit 20 transmits data received from the control unit 19 to the network 3, and outputs data received from the network 3 to the control unit 19.

The control unit 19 according to this embodiment has various functions in addition to the above-described functions. As shown in FIG. 3, the control unit 19 includes, as function blocks, a reference timing adjustment unit 190, a window position setting unit 191, a delay amount acquisition unit 192, a transmission timing control unit 193, and an interference wave level acquisition unit 194.

The reference timing adjustment unit 190 adjusts the reference timing in the base station 1. The window position setting unit 191 sets an FFT window position in the FFT process performed by the FFT processing unit 16. The interference wave level acquisition unit 194 obtains a signal level of an interference wave received by the reception unit 12. Hereinafter, the signal level of the interference wave may be referred to as "interference wave level".

Based on a known signal from the communication terminal 2 that is not synchronized with the base station 1, the delay amount acquisition unit 192 obtains a delay amount by which a reception timing of receiving the signal from this communication terminal 2 is delayed from the reference timing. Based on the delay amount obtained by the delay amount acquisition unit 192, the transmission timing control unit 193 generates a transmission timing control signal for adjusting a transmission timing in the communication terminal 2. The transmission timing control signal is included in the OFDM signal for transmission, and transmitted from the transmission unit 13 to the communication terminal 2. The communication terminal 2 adjusts the transmission timing in its own device based on the transmission timing control signal received from the base station 1. This enables the base station 1 to receive a signal from each communication terminal 2 at the reference timing. As a result, in the base station 1, the FFT processing unit 16 can perform the FFT process on the signal supplied from each of the communication terminals 2 in an appropriate FFT window position, and moreover the orthogonality among signals supplied from a plurality of communication terminals 2 is ensured. Accordingly, the base station 1 can accurately obtain data included in the signal supplied from each communication terminal 2.

Next, a description will be given to a configuration of a TDMA/TDD frame 200 that is used for communication with the communication terminal 2 by the base station 1. FIG. 4 is a diagram showing a configuration of the TDMA/TDD frame 200. As shown in FIG. 4, the TDMA/TDD frame 200 is identified on a time-frequency plane with the horizontal axis and the vertical axis thereof representing time and frequency, respectively. One TDMA/TDD frame 200 includes a reception frame 200r by which the base station 1 receives a signal from the communication terminal 2, and a transmission frame 200s by which the base station 1 transmits a signal to the communication terminal 2. Each of the reception frame 200r and the transmission frame 200s includes a first slot SL1 to a fourth slot SL4 in the time direction, and a first sub channel SCH1 to an i-th sub channel SCHi (i≥2) in the frequency direction. In this embodiment, for example, i=9 is set, and as shown in FIG. 4, each of the reception frame 200r and the transmission frame 200s includes the first sub channel SCH1 to a ninth sub channel SCH9 in the frequency direction. Hereinafter, when no particular distinction is required among the first slot SL1 to the fourth slot SL4, each of them may be simply referred to as "slot SL". Likewise, when no particular distinction is required among the first sub channel SCH1 to the ninth sub channel SCH9, each of them may be simply referred to as "sub channel SCH". Moreover, the TDMA/TDD frame 200 may be simply referred to as "frame".

In the TDMA/TDD frame 200, the time width of one slot SL is set to be 625 μs. Accordingly, each of the reception frame 200r and the transmission frame 200s has a time length of 2.5 ms, and one TDMA/TDD frame 200 has a time length of 5 ms. The bandwidth of one sub channel SCH is 900 kHz, and one sub channel SCH includes 24 subcarriers.

One slot SL and one sub channel SCH form a PRU (Physical Resource Unit) 210 that is a unit radio resource. The communication between the base station 1 and the communication terminal 2 is performed on a PRU 210 basis. For example, in the base station 1, allocation of a radio resource to the communication terminal 2 is made on a PRU 210 basis. In each of the reception frame 200r and the transmission frame 200s, four PRUs 210 are arranged along the time direction. In the TDMA/TDD frame 200 as a whole, eight PRUs 210 are arranged along the time direction. In the TDMA/TDD frame 200, nine PRUs 210, the same number as the number of sub channels, are arranged in the frequency direction.

When receiving signals from the plurality of communication terminals 2, the base station 1 shares the thirty-six PRUs 210 of the reception frame 200r among the plurality of communication terminals 2, and when transmitting signals to the plurality of communication terminals 2, the base station 1 shares the thirty-six PRUs 210 of the transmission frame 200s among the plurality of communication terminals 2. With respect to each of the reception frame 200r and the transmission frame 200s, the control unit 19 of the base station 1 allocates at least one PRU 210 of the thirty-six PRUs 210 to each of the plurality of communication terminals 2 that are communication objects, such that there is no overlap among the plurality of communication terminals 2. In the base station 1 according to this embodiment based on the next-generation PHS, the PRUs 210 located in the same position in the reception frame 200r and in the transmission frame 200s are allocated to the same communication terminal 2. For example, in a case where the PRU 210 including the second slot SL2 and the sixth sub channel SCH6 and the PRU 210 including the third slot SL3 and the sixth sub channel SCH6 of the reception frame 200r are allocated to a certain communication terminal 2, the PRU 210 including the second slot SL2 and the sixth sub channel SCH6 and the PRU 210 including the third slot SL3 and the sixth sub channel SCH6 of the transmission frame 200s are allocated to this communication terminal 2.

When the control unit 19 allocates the PRU 210 to the communication terminal 2, such PRUs 210 (hereinafter referred to as "available PRUs 210") of the reception frame 200r and the transmission frame 200s that are used neither by the own device nor by the surrounding base station 1 are allocated to the communication terminal 2. More specifically, the interference wave level acquisition unit 194 of the control unit 19 obtains the interference wave level in each PRU 210 of the reception frame 200r that is not used by the own device, based on the signal outputted from the FFT processing unit 16. The control unit 19 determines that such a PRU 210 that the interference wave level obtained by the interference wave level acquisition unit 194 is equal to or less than a threshold value is the available PRU 210. Then, the control unit 19 allocates at least one of the available PRUs 210 to the communication terminal 2, for use in reception. As described above, in each base station 1, the PRUs 210 located in the same position in the reception frame 200r and in the transmission frame 200s are allocated to the same communication terminal 2. Accordingly, in the transmission frame 200s, the PRU 210 located in the same position as the available PRU 210 of the reception frame 200r serves as the available PRU 210. Therefore, in the transmission frame 200s as well, the available PRU 210 is allocated to the communication terminal 2.

In this manner, the PRUs 210 are allocated to each communication terminal 2 that is the communication object, and then the wireless communication unit 11 performs communication with each communication object communication terminal 2 by using the allocated PRUs 210.

In the wireless communication system 100 described above, if the base station 1 is newly installed and powered on, the control unit 19 of this newly installed base station 1 identifies a reference timing in a surrounding base station 1 capable of communication with the own device, based on a control signal supplied from this surrounding base station 1. Then, the control unit 19 sets the identified reference timing in the surrounding base station 1 to be a reference timing in the own device, and performs communication with the communication terminal 2. As a result, the newly installed base station 1 operates in synchronization with the surrounding base station 1.

In the wireless communication system 100, as in the example shown in FIG. 2 described above, the communication terminal 2B in communication with the base station 1A may exist closer to the base station 1B located in the surrounding of the base station 1A than to the base station 1A. On the other hand, the base station 1A adjusts the transmission timing in the communication terminal 2B such that the signal supplied from the communication terminal 2B is received at the reference timing. Since the reference timings in the base stations 1A and 1B in synchronization with each other are coincident, the base station 1A receives the signal from the communication terminal 2B at the reference timing, while the base station 1B located closer to the communication terminal 2B than the base station 1A is receives the signal from the communication terminal 2B at a timing earlier than the reference timing. Accordingly, in the base station 1B, when the FFT process is performed on the signal received from the communication terminal 2B, the FFT window position that is set based on the reference timing is shifted relative to the reception signal.

Figure 5:
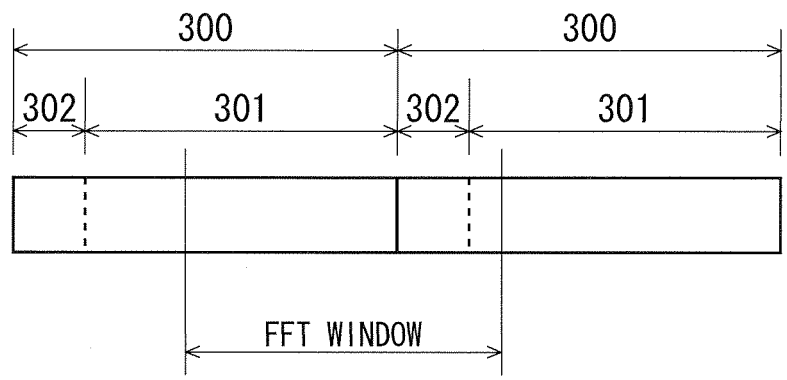
FIG. 5 A diagram showing a situation where an FFT window position is shifted relative to an OFDM symbol.

FIG. 5 is a diagram showing the relationship between the OFDM signal that is received as the interference wave from the communication terminal 2B by the base station 1B and the FFT window position that is set to the OFDM signal by the base station 1B. As shown in FIG. 5, an OFDM symbol 300 that is an OFDM signal corresponding to one symbol includes an effective symbol 301 that is an original signal corresponding to one symbol, and a guard interval 302 prepended thereto. The guard interval 302 is a copy of a latter part of the effective symbol 301.

If the FFT window is set to fall within a processing object OFDM symbol 300, the object OFDM symbol 300 can be accurately demodulated.

However, as shown in FIG. 5, if the FFT window is set to extend over the processing object OFDM symbol 300 and the subsequent OFDM symbol 300, the processing object OFDM symbol 300 cannot be accurately demodulated. Accordingly, in a case where the base station 1B receives the signal from the communication terminal 2B earlier than the reference timing so that the FFT window set is shifted relative to the OFDM symbol 300 of this reception signal as shown in FIG. 5, an interference wave is detected also in frequency bands other than a frequency band of this reception signal. As a result, a reception signal in frequency bands other than the frequency band of this reception signal is degraded.

Figure 6:
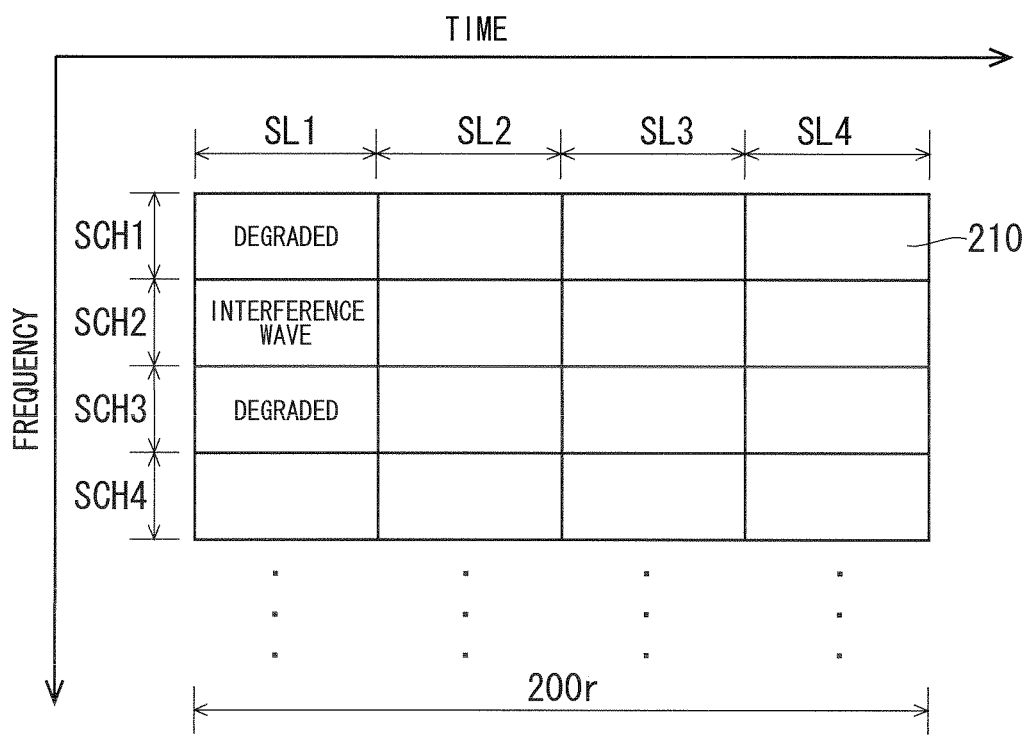
FIG. 6 A diagram showing a situation where a signal degradation occurs in frequency bands other than a frequency band of an interference wave due to a shift of an FFT window position relative to the interference wave.
Figure 7:
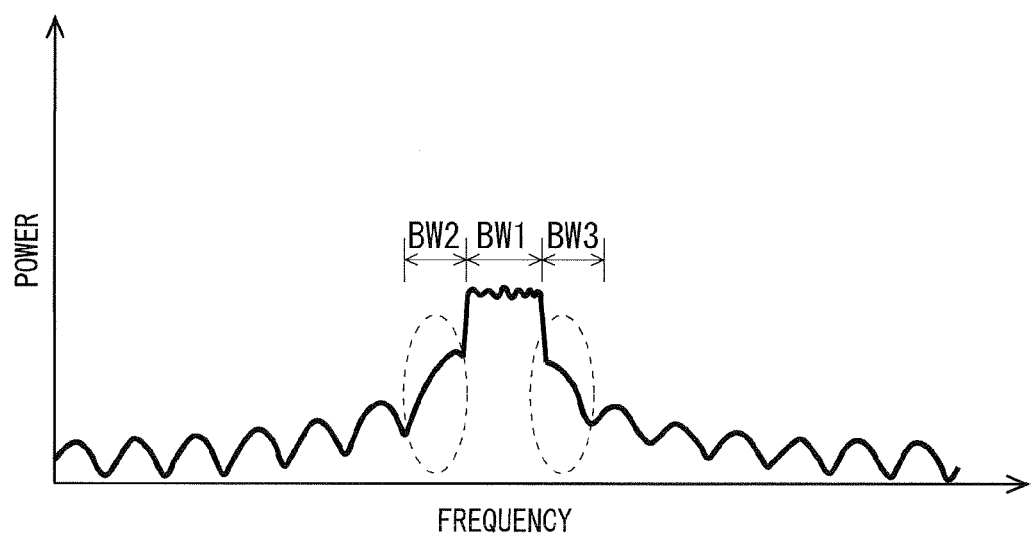
FIG. 7 A diagram showing a situation where an interference wave is detected in frequency bands other than a frequency band of an interference wave due to a shift of an FFT window position relative to the interference wave.

For example, in a case where the base station 1A and the communication terminal 2B communicate with each other by using the PRU 210 including the first slot SL1 and the second sub channel SCH2, the base station 1B detects an interference wave not only in the PRU 210 including the first slot SL1 and the second sub channel SCH2 but also two PRUs 210 adjacent to the above-mentioned PRU 210 in the frequency direction, namely, the PRU 210 including the first slot SL1 and the first sub channel SCH1 and the PRU 210 and the first slot SL1 and the third sub channel SCH3. Therefore, as shown in FIG. 6, the signals received in these two PRUs 210 are degraded. FIG. 7 is a diagram showing a result of the FFT process performed by the base station 1B on the signal supplied from the communication terminal 2B. As shown in the parts within the broken line circles in FIG. 7, signal power increases in frequency bands BW2 and BW3 that are adjacent to a frequency band BW1 of the signal received from the communication terminal 2B. This is because an interference wave is detected in the adjacent frequency bands BW2 and BW3.

As described above, the base station 1B detects the interference wave in the frequency bands other than the frequency band of the interference wave from the communication terminal 2B. Therefore, if the signal is received from the communication object communication terminal 2 by using frequency bands other than the frequency band of the interference wave from the communication terminal 2B, the reception signal is degraded.

Figure 8:
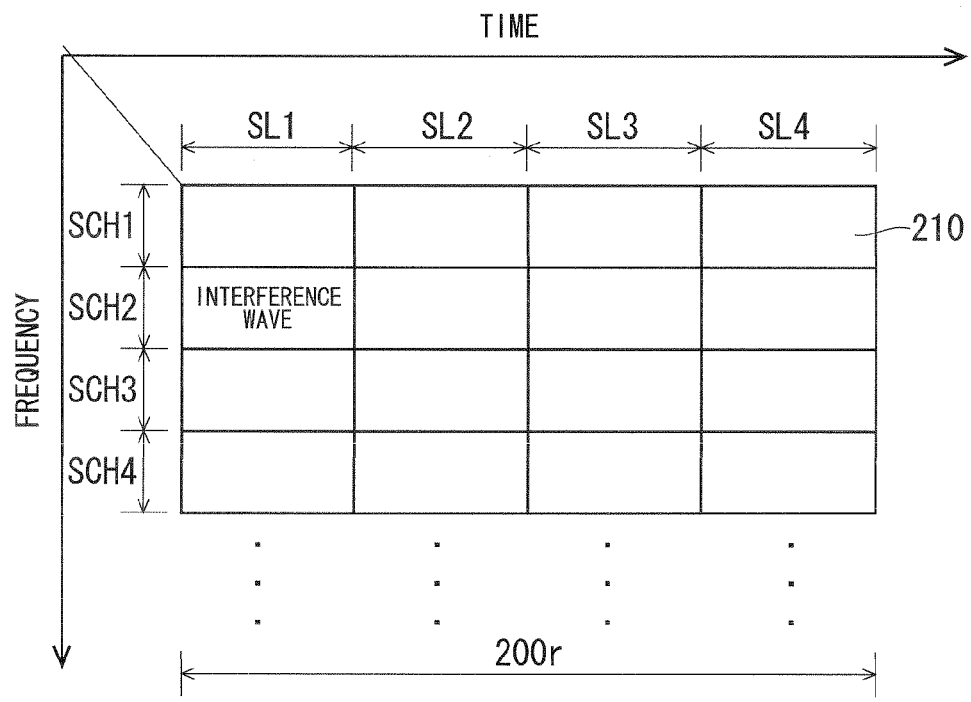
FIG. 8 A diagram showing a situation where the signal degradation in the frequency bands other than the frequency band of the interference wave is suppressed as a result of adjustment of a reference timing FIG. 9 A flowchart showing an adjustment operation for adjusting the reference timing in the base station according to the embodiment.

Thus, in the base station 1 according to this embodiment, the reference timing is adjusted so as to allow an appropriate FFT window position to be set to the interference wave supplied from the communication terminal 2 in communication with the surrounding base station 1. This can suppress detection of an interference wave in frequency bands other than the frequency band of the interference wave supplied from the communication terminal 2. For example, in the example shown in FIG. 2, when the base station 1A and the communication terminal 2B communicate with each other by using the PRU 210 including the first slot SL1 and the second sub channel SCH2, the base station 1B detects an interference wave only in the PRU 210 including the first slot SL1 and the second sub channel SCH2, as shown in FIG. 8. In the following, a method for adjusting the reference timing in the base station 1 will be described in detail.

Figure 9:
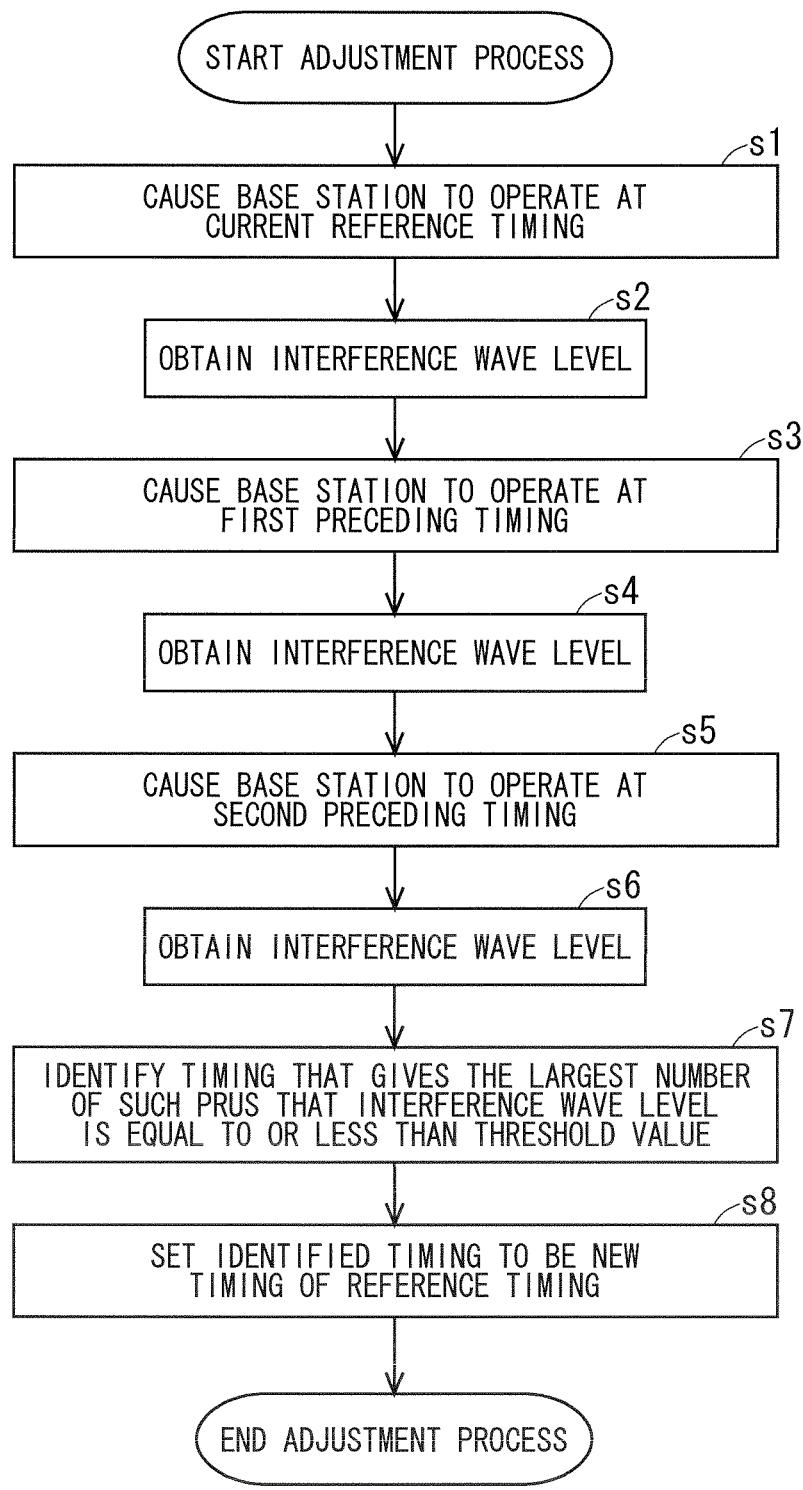
Figure 10:
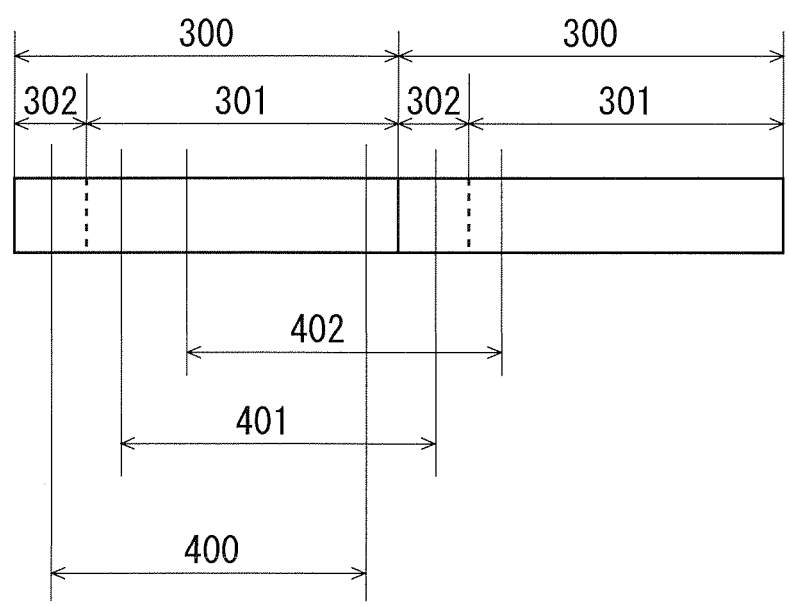
FIG. 10 A diagram showing a positional relationship between the OFDM symbol and the FFT window at a plurality of candidate timings.

FIG. 9 is a flowchart showing an adjustment operation for adjusting the reference timing in the base station 1. In this embodiment, a new timing of the reference timing is determined from a plurality of candidate timings. The plurality of candidate timings include, for example, a current timing of the reference timing, a first preceding timing that is approximately several μs prior to the current timing, and a second preceding timing that is approximately several μs prior to the first preceding timing. Accordingly, as shown in FIG. 10, an FFT window 400 in a case where the base station 1 operates at the second preceding timing as the reference timing is located approximately several μs prior to an FFT window 401 in a case where the base station 1 operates at the first preceding timing as the reference timing. The FFT window 401 in the case where the base station 1 operates at the first preceding timing as the reference timing is located approximately several μs prior to an FFT window 402 in a case where the base station 1 operates at the current reference timing. In the next-generation PHS, an OFDM symbol length, that is, a symbol period, is set to be 30 μs or 33.33 μs.

As shown in FIG. 9, in step s1, the reference timing adjustment unit 190 maintains the current reference timing, and causes the base station 1 to perform a communication operation at the current reference timing. Then, in step s2, the interference wave level acquisition unit 194 obtains the interference wave level in each PRU 210 of the reception frame 200r that is not used by the own device, based on the output signal of the FFT processing unit 16.

When the next TDMA/TDD frame 200 comes, in step s3, the reference timing adjustment unit 190 changes the reference timing into the first preceding timing, and causes the base station 1 to perform the communication operation at the first preceding timing. Then, in step s4, the interference wave level acquisition unit 194 obtains the interference wave level in each PRU 210 of the reception frame 200r that is not used by the own device, based on the output signal of the FFT processing unit 16.

When the next TDMA/TDD frame 200 comes, in step s5, the reference timing adjustment unit 190 changes the reference timing into the second preceding timing, and causes the base station 1 to perform the communication operation at the second preceding timing. Then, in step s6, the interference wave level acquisition unit 194 obtains the interference wave level in each PRU 210 of the reception frame 200r that is not used by the own device, based on the output signal from the FFT processing unit 16.

When the next TDMA/TDD frame 200 comes, in step s7, the reference timing adjustment unit 190 identifies the candidate timing that gives the largest number of such PRUs 210 (available PRUs 210) that the interference wave level obtained by the interference wave level acquisition unit 194 is equal to or less than the threshold value, among the plurality of candidate timings, namely, from the current reference timing, the first preceding timing, and the second preceding timing. In other words, the reference timing adjustment unit 190 identifies, among the plurality of candidate timings, the candidate timing that is least affected by the interference wave in the base station 1. Then, in step s8, the reference timing adjustment unit 190 sets the identified candidate timing to be a new timing of the reference timing.

The control unit 19 periodically, for example, in every several tens of frames, performs a sequence of processing of step s1 to s8 described above.

If the reference timing adjustment unit 190 changes the reference timing while the base station 1 is in communication with the communication terminal 2, the control unit 19 controls the transmission timing in the communication terminal 2 that is currently in communication with the base station 1 in accordance with the amount of change of the reference timing. To be specific, the transmission timing control unit 193 generates the transmission timing control signal for adjusting the transmission timing, in accordance with the amount of change of the reference timing, in the communication terminal 2 that is currently in communication with the base station 1. The transmission timing control signal is included in the OFDM signal for transmission, and transmitted from the transmission unit 13 to the communication terminal 2 that is currently in communication with the base station 1. The communication terminal 2 that is currently in communication with the base station 1 adjusts the transmission timing based on the received transmission timing control signal. As a result, in the base station 1, even after the reference timing is changed, the OFDM signal from the communication terminal 2 that is currently in communication can be received at the reference timing. Accordingly, in the base station 1, even after the reference timing is changed, data from the communication terminal 2 that is currently in communication can be accurately obtained.

As described above, in the base station 1 according to this embodiment, with respect to each of the plurality of candidate timings for the reference timing, the signal level of the interference wave in the PRU 210 not used by the base station 1, which occurs in a case where the base station 1 performs the communication operation at this candidate timing, is obtained based on the output signal of the FFT processing unit 16. Then, the base station 1 determines a new timing of the reference timing from the plurality of candidate timings based on the obtained signal level of the interference wave. Accordingly, the base station 1 can set an appropriate FFT window position relative to the interference wave from the communication terminal 2 that is in communication with the surrounding base station 1. In an example shown in FIG. 10, since the FFT window 400 at the second preceding timing falls within one OFDM symbol 300, the FFT window 400 is located in an appropriate position relative to the interference wave from the communication terminal 2. Therefore, in the base station 1, detection of an interference wave in frequency bands other than the frequency band of the interference wave supplied from the communication terminal 2 that is in communication with the surrounding base station 1 is suppressed. Thus, degradation of the reception signal in the frequency bands is prevented. As a result, the communication quality of the base station 1 is improved.

In the example described above, the interference wave level at one candidate timing is obtained in one TDMA/TDD frame 200. However, since nineteen symbol periods are arranged in the time-axis direction in each PRU 210, the nineteen symbol periods may be divided into three or more groups so that the interference wave level at each of the three candidate timings is obtained in one TDMA/TDD frame 200. For example, with respect to each PRU 210 of the reception frame 200r that is not used by the own device, the base station 1 obtains the interference wave level at the current reference timing by using the OFDM symbol 300 in the first five symbol periods among the nineteen symbol periods. Then, the base station 1 obtains the interference wave level at the first preceding timing by using the OFDM symbol 300 in the subsequent five symbol periods. Then, the base station 1 obtains the interference wave level at the second preceding timing by using the OFDM symbol 300 in the subsequent five symbol periods.

It may be also possible that the interference levels at the plurality of candidate timings are concurrently obtained in one TDMA/TDD frame 200. For example, three pairs of the FFT processing unit 16 and the interference wave level acquisition unit 194 are provided, and FFT window positions based on different candidate timings are set to the three FFT processing units 16, respectively. Then, by using the three pairs of the FFT processing unit 16 and the interference wave level acquisition unit 194, the interference wave levels at the plurality of candidate timings are concurrently obtained in one TDMA/TDD frame 200. Accordingly, in the next TDMA/TDD frame 200, the base station 1 can operate based on a new reference timing.

<Modification>

Figure 11:
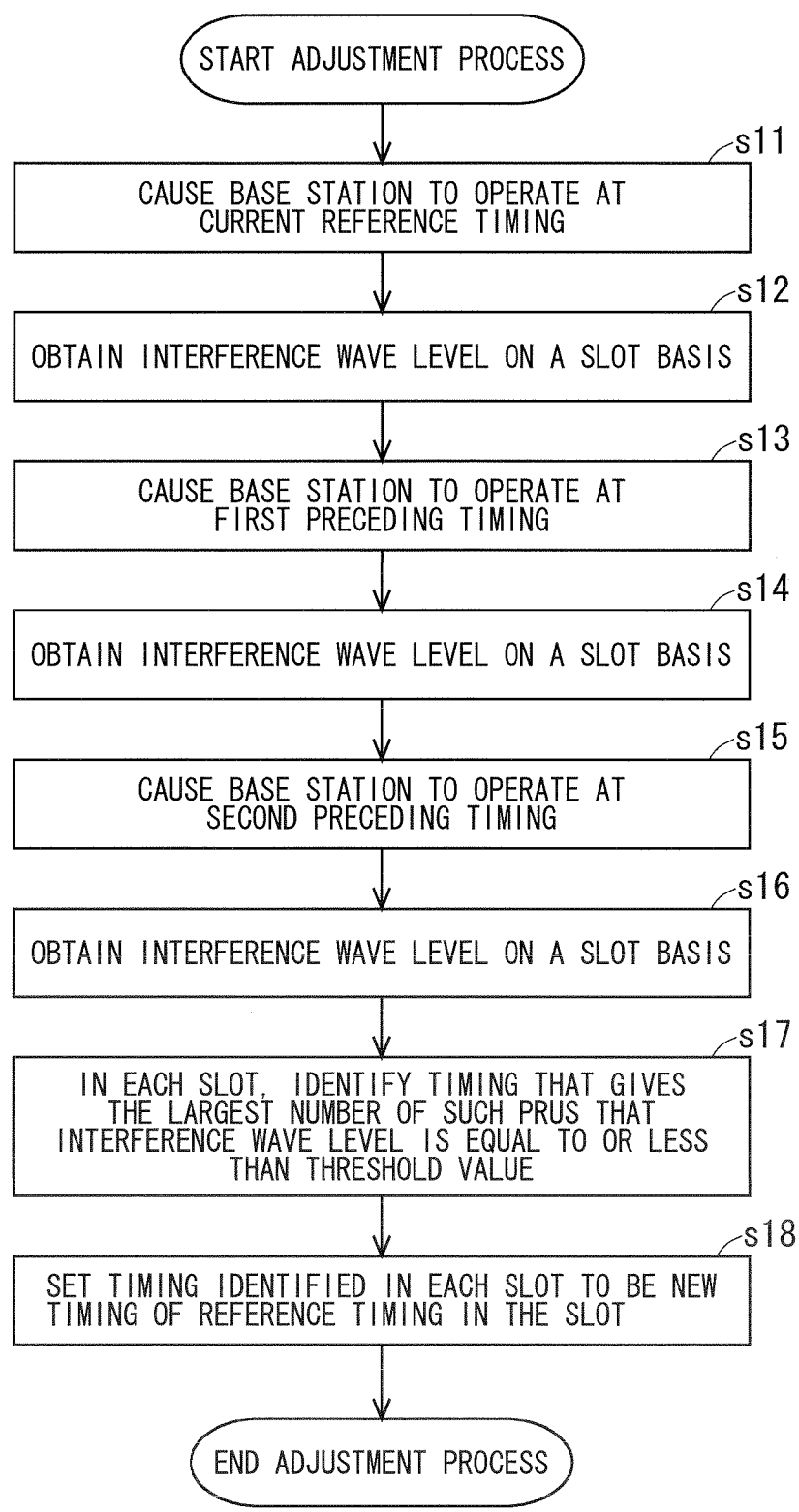
FIG. 11 A flowchart showing an adjustment operation for adjusting a reference timing in a base station according to a modification of the embodiment.

Although in the example described above, the reference timing in each of the first slot SL1 to the fourth slot SL4 cannot individually be adjusted, such an adjustment may be allowed. FIG. 11 is a flowchart showing an adjustment operation for adjusting the reference timing in the base station 1 in such a manner.

As shown in FIG. 11, in step s11, the reference timing adjustment unit 190 maintains the current reference timing, and causes the base station 1 to perform the communication operation at the current reference timing. Then, in step s12, the interference wave level acquisition unit 194 obtains the interference wave level in each PRU 210 not used by the own device, in each of the first slot SL1 to the fourth slot SL4 of the reception frame 200r.

When the next TDMA/TDD frame 200 comes, in step s13, the reference timing adjustment unit 190 changes the reference timing into the first preceding timing, and causes the base station 1 to perform the communication operation at the first preceding timing. Then, in step s14, the interference wave level acquisition unit 194 obtains the interference wave level in each PRU 210 not used by the own device, in each of the first slot SL1 to the fourth slot SL4 of the reception frame 200r.

When the next TDMA/TDD frame 200 comes, in step s15, the reference timing adjustment unit 190 changes the reference timing into the second preceding timing, and causes the base station 1 to perform the communication operation at the second preceding timing. Then, in step s16, the interference wave level acquisition unit 194 obtains the interference wave level in each PRU 210 not used by the own device, in each of the first slot SL1 to the fourth slot SL4 of the reception frame 200r.

When the next TDMA/TDD frame 200 comes, in step s17, the reference timing adjustment unit 190 identifies, with respect to each of the first slot SL1 to the fourth slot SL4, the candidate timing that gives the largest number of available PRUs 210 from the plurality of candidate timings, by using the interference wave levels obtained in steps s12, s14, and s16. Then, in step s18, the reference timing adjustment unit 190 sets the candidate timing identified with respect to each of the first slot SL1 to the fourth slot SL4, to be a new timing of the reference timing in this slot SL.

The control unit 19 periodically, for example, in every several tens of frame, performs a sequence of processing of steps s11 to s18 described above.

In this modification, the base station 1 adjusts the reference timing on a slot SL basis, and therefore the transmission timing in the communication terminal 2 that is in communication with the base station 1 is adjusted on a slot SL basis by the base station 1.

In this manner, if the reference timing can be individually adjusted in each of the first slot SL1 to the fourth slot SL4, an appropriate FFT window position can be individually set with respect to each of the interference waves received in the plurality of slots SL by the base station 1. For example, as shown in FIG. 12, in a case where the base station 1 receives, in the first slot SL1 and the third slot SL3, the interference wave from one communication terminal 2 or a plurality of communication terminals 2 that is or are in communication with the surrounding base station 1, an appropriate FFT window position can be individually set to the interference wave received in the first slot SL1 and to the interference wave received in the third slot SL3.

On the other hand, in a case where a common reference timing is applied to the first slot SL1 to the fourth slot SL4 as shown in the embodiment described above, an FFT window position is set based on the common reference timing to the interference waves received in the first slot SL1 and the third slot SL3 as shown in FIG. 12. In a case where the interference waves received in the first slot SL1 and the third slot SL3 are transmitted from the same communication terminal 2, the relationships between the reception timings at which these interference waves are received and the reference timing in the base station 1 are substantially the same. Accordingly, in the base station 1, even if the FFT window position is set to these interference waves based on the common reference timing, no particular problem occurs.

However, in a case where the interference waves received in the first slot SL1 and the third slot SL3 are transmitted from different communication terminals 2, the relationships between the reception timings at which these interference waves are received and the reference timing in the base station 1 are normally different from each other. Accordingly, if the FFT window position is set to these interference waves based on the common reference timing, it is difficult to set the FFT window in the best position with respect to both of these interference waves, though the FFT window can be set in an appropriate position to some extent with respect to each of these interference waves.

In the modification described above, the FFT window position can be individually set to each of the interference waves received in the plurality of slots SL. Accordingly, the FFT window can be set in a more appropriate position with respect to each of the interference waves. Therefore, in the base station 1, the detection of an interference wave in frequency bands other than the frequency band of the interference wave supplied from the communication terminal 2 that is in communication with the surrounding base station 1 is further suppressed. Thus, the communication quality of the base station 1 is further improved.

In the example described above, the interference wave level at one candidate timing is obtained in one TDMA/TDD frame 200. However, since each slot SL includes nineteen symbol periods, the nineteen symbol periods may be divided into three or more groups so that the interference wave level at each of the three candidate timings is obtained in one TDMA/TDD frame 200. For example, with respect to each slot SL of the reception frame 200r, the base station 1 obtains the interference wave level at the current reference timing by using the OFDM symbol 300 in five symbol periods among the nineteen symbol periods included in this slot SL. Then, the base station 1 obtains the interference wave level at the first preceding timing by using the OFDM symbol 300 in the subsequent five symbol periods. Then, the base station 1 obtains the interference wave level at the second preceding timing by using the OFDM symbol 300 in the subsequent five symbol periods.

It may be also possible that the interference levels of the plurality of candidate timings are concurrently obtained in one TDMA/TDD frame 200. For example, as described above, three pairs of the FFT processing unit 16 and the interference wave level acquisition unit 194 are provided, and FFT window positions based on different candidate timings are set to the three FFT processing units 16, respectively. Then, by using the three pairs of the FFT processing unit 16 and the interference wave level acquisition unit 194, the interference wave levels at the plurality of candidate timings are concurrently obtained for each slot SL in one TDMA/TDD frame 200. Accordingly, in the next TDMA/TDD frame 200, the base station 1 can operate based on a new reference timing.

The base station 1 may automatically select whether to apply the common reference timing to the first slot SL1 to the fourth slot SL4 or to apply the individual reference timing to each of the first slot SL1 to the fourth slot SL4, in accordance with an operation state of the own device. That is, the base station 1 may be configured to select whether to perform the adjustment operation shown in FIG. 9 or the adjustment operation shown in FIG. 11.

For example, the base station 1 selects whether to perform the adjustment operation shown in FIG. 9 or the adjustment operation shown in FIG. 11 in accordance with a state of allocation of the radio resources in the own device to the communication terminal 2. More specifically, in a case where the base station 1 communicating with one communication terminal 2C (see FIG. 2) allocates to the one communication terminal 2C a plurality of PRUs 210 belonging to a plurality of slots SL of the reception frame 200r, the base station 1 performs the adjustment operation shown in FIG. 9. FIG. 13 is a diagram showing an example of a situation where a plurality of PRUs 210 belonging to a plurality of slots SL are allocated to the communication terminal 2C. In the example shown in FIG. 13, the plurality of PRUs 210 belonging to the first slot SL1 and the third slot SL3 are allocated to the communication terminal 2C.

Figure 14:
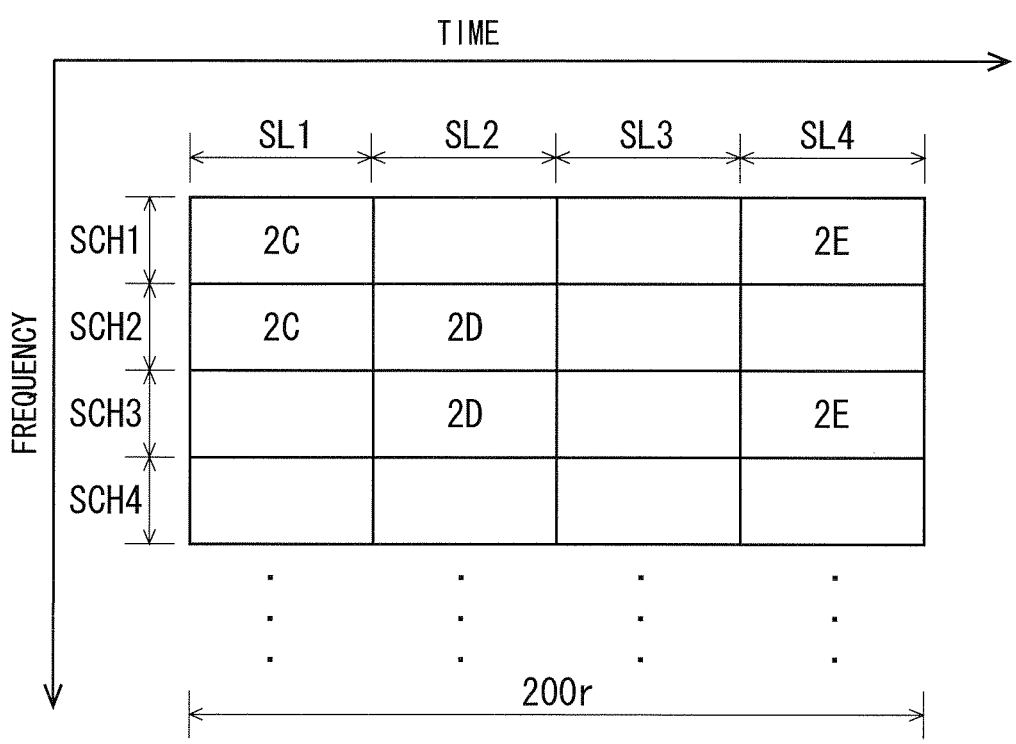
FIG. 14 A diagram showing an example of allocation of PRUs to communication terminals.

In a case where the base station 1 communicating with a plurality of communication terminals 2 allocates PRUs 210 belonging to different slots SL to the plurality of communication terminals 2, the base station 1 performs the adjustment operation shown in FIG. 11. FIG. 14 is a diagram showing an example of a situation where PRUs 210 belonging to different slots SL are allocated to communication terminals 2C to 2E when the base station 1 communicates with the communication terminals 2C to 2E. In the example shown in FIG. 14, the PRUs 210 belonging to the first slot SL1 are allocated to the communication terminal 2C, the PRUs 210 belonging to the second slot SL2 are allocated to the communication terminal 2D, and the PRUs 210 belonging to the fourth slot SL4 are allocated to the communication terminal 2E.

In the embodiment and the modification described above, among the plurality of candidate timings, the candidate timing that gives the largest number of such PRUs 210 that the interference wave level is equal to or less than the threshold value is set to be the new timing of the reference timing. Alternatively, among the plurality of candidate timings, the candidate timing that gives the lowest total interference wave levels in a plurality of PRUs 210 not used by the base station 1 may be set to be the new timing of the reference timing. Instead, among the plurality of candidate timings, the candidate timing that gives the lowest average value of the interference wave levels in a plurality of PRUs 210 not used by the base station 1 may be set to be the new timing of the reference timing.

In the embodiment and the modification described above, a case where the present invention is applied to the next-generation PHS has been described. However, needless to say, the present invention is applicable to other communication systems as long as the communication systems adopt the OFDMA scheme. For example, the present invention is applicable to the LTE (Long Term Evolution) or the WiMAX (Worldwide Interoperability for Microwave Access).

While the invention has been described in detail, the foregoing description is in all aspects illustrative and not restrictive. It will be appreciated that numerous modifications unillustrated herein can be made without departing from the scope of the present invention.

DESCRIPTION OF THE REFERENCE NUMERALS 1, 1A, 1B base station
2, 2A to 2C communication terminal
12 reception unit
13 transmission unit
16 FFT processing unit
190 reference timing adjustment unit
193 transmission timing control unit
194 interference wave level acquisition unit

The invention claimed is:

1. One base station included in a wireless communication system in which a plurality of base stations in synchronization with one another perform communication with communication terminals, wherein each of the plurality of base stations performs communication with a plurality of communication terminals based on a reference timing while sharing a plurality of unit radio resources identified on a time-frequency plane among the plurality of communication terminals, the one base station comprises:
 a reception unit for receiving a multi-carrier signal in which a plurality of carrier waves being orthogonal to one another are combined;
 an FFT processing unit for performing an FFT (Fast Fourier Transform) process on the multi-carrier signal received by the reception unit;
 an interference wave level acquisition unit for obtaining, with respect to each of a plurality of candidate timings for the reference timing, a signal level of an interference wave in a unit radio resource not used by the one base station, based on an output signal of the FFT processing unit; and
 a reference timing adjustment unit for determining a new timing of the reference timing from the plurality of candidate timings based on the signal level of the interference wave obtained by the interference wave level acquisition unit.

2. The base station according to claim 1, further comprising:
 a transmission timing control unit for, when the reference timing adjustment unit changes the reference timing, generating a control signal for adjusting a transmission timing in a communication terminal that is currently in communication with the one base station, in accordance with the amount of change of the reference timing; and
 a transmission unit for transmitting the control signal to the communication terminal that is currently in communication.

3. A method for adjusting a reference timing in one base station included in a wireless communication system in which a plurality of base stations in synchronization with one another perform communication with communication terminals, wherein each of the plurality of base stations performs communication with a plurality of communication terminals based on a reference timing while sharing a plurality of unit radio resources identified on a time-frequency plane among the plurality of communication terminals, the method comprises the steps of:
 (a) in the one base station that performs a communication operation at one candidate timing among a plurality of candidate timings for the reference timing, performing an FFT process on a multi-carrier signal received by the one base station in which a plurality of carrier waves being orthogonal to one another are combined; and
 (b) in the one base station that performs the communication operation at the one candidate timing, obtaining a signal level of an interference wave in a unit radio resource not used by the one base station based on a result of the FFT process performed in the step (a),
 the steps (a) and (b) are performed with respect to each of the plurality of candidate timings,
 the method further comprises the step of: (c) determining a new timing of the reference timing from the plurality of candidate timings based on the signal levels of the interference waves obtained with respect to the plurality of candidate timings in the step (b).

* * * * *